US008225895B1

(12) United States Patent
Salton et al.

(10) Patent No.: US 8,225,895 B1
(45) Date of Patent: Jul. 24, 2012

(54) ROBOTIC VEHICLE WITH MULTIPLE TRACKED MOBILITY PLATFORMS

(75) Inventors: Jonathan R. Salton, Albuquerque, NM (US); James H. Buttz, Albuquerque, NM (US); Justin Garretson, Albuquerque, NM (US); David R. Hayward, Wetmore, CO (US); Clinton G. Hobart, Albuquerque, NM (US); Jamieson K. Deuel, Jr., Albuquerque, NM (US)

(73) Assignee: Sandia Corporation, Albuquerque, MN (US)

( * ) Notice: Subject to any disclaimer, the term of this patent is extended or adjusted under 35 U.S.C. 154(b) by 285 days.

(21) Appl. No.: 12/765,144

(22) Filed: Apr. 22, 2010

(51) Int. Cl.
  *B60T 7/16* (2006.01)
(52) U.S. Cl. ......... 180/167; 180/9.21; 180/9.3; 280/474
(58) Field of Classification Search .................. 180/167, 180/168, 9.32, 9.4, 14.2, 9.1, 900, 901, 9.44, 180/9.21, 9.28, 9.3; 280/474, 508, 512, 448, 280/478.1, 477; 324/326, 337, 336; 701/23, 701/300, 408
See application file for complete search history.

(56) References Cited

U.S. PATENT DOCUMENTS

| | | | |
|---|---|---|---|
| 4,709,773 A * | 12/1987 | Clement et al. | 180/9.32 |
| 4,932,831 A * | 6/1990 | White et al. | 180/9.32 |
| 5,174,405 A * | 12/1992 | Carra et al. | 180/9.32 |
| 5,561,883 A | 10/1996 | Landry | |
| 6,333,631 B1 * | 12/2001 | Das et al. | 324/326 |
| 6,442,476 B1 * | 8/2002 | Poropat | 701/23 |
| 6,484,083 B1 | 11/2002 | Hayward | |
| 6,488,306 B1 | 12/2002 | Shirey | |
| 6,523,629 B1 | 2/2003 | Buttz | |
| 6,535,793 B2 * | 3/2003 | Allard | 700/259 |
| 6,837,318 B1 | 1/2005 | Craig | |
| 7,011,171 B1 | 3/2006 | Poulter | |
| 7,069,124 B1 | 6/2006 | Whittaker | |
| 7,581,605 B2 * | 9/2009 | Caspi et al. | 180/9.1 |
| 7,597,162 B2 * | 10/2009 | Won | 180/9.32 |
| 8,002,365 B2 * | 8/2011 | Jacobsen et al. | 180/9.44 |
| 2008/0223630 A1 | 9/2008 | Couture | |

OTHER PUBLICATIONS

Kamegawa, et al., "Evaluation of Snake-like Rescue Robot "KOHGA" for Usability of", Proc. 2005 IEEE Int. Wshp on Safety, Security and Rescue Robotics, Kobe, JP Jun. 2005.
Zhao, et al., "Research on the Application of a Marsupial Robot for Coal mine Rescue", ICIRA 2008, Part II, LNAI 5315, pp. 1127-1136, Oct. 14, 2008.

* cited by examiner

*Primary Examiner* — Hau Phan
(74) *Attorney, Agent, or Firm* — Olivia J. Tsai (57) ABSTRACT

A robotic vehicle having two or more tracked mobility platforms that are mechanically linked together with a two-dimensional coupling, thereby forming a composite vehicle of increased mobility. The robotic vehicle is operative in hazardous environments and can be capable of semi-submersible operation. The robotic vehicle is capable of remote controlled operation via radio frequency and/or fiber optic communication link to a remote operator control unit. The tracks have a plurality of track-edge scallop cut-outs that allow the tracks to easily grab onto and roll across railroad tracks, especially when crossing the railroad tracks at an oblique angle.

18 Claims, 7 Drawing Sheets

Pan
FIG. 3A

FIG. 3

Tilt
FIG. 3B

ROBOTIC VEHICLE WITH MULTIPLE TRACKED MOBILITY PLATFORMS

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to robotic vehicles having two or more tracked mobility platforms that are mechanically linked together thereby forming a composite vehicle of increased mobility. The invention further relates to robotic vehicles that are operative in hazardous environments and can be capable of semi-submersible operation. The invention additionally relates to robotic vehicles that are capable of remote controlled operation via radio frequency and/or fiber optic communication link to a remote operator control unit.

BACKGROUND OF THE INVENTION

Robotic vehicles are increasingly used to provide access, reconnaissance and physical interaction within environments that can otherwise be hazardous to people including first responders, search and rescue teams, police, security forces and military personnel. Hazards can include improvised explosive devices (IEDs), toxic chemical vapors, biohazards, radioactive materials, explosive vapors, and oxygen deprived atmospheres. In numerous applications, there is a need for a robotic vehicle that can negotiate rugged terrain under the control of a remote operator and provide reconnaissance of and communication within an environment that can be hazardous to humans and/or trained rescue animals (e.g. dogs). In one non-limiting exemplary application there is a need for robotic vehicles to aid in reconnaissance and search and rescue missions associated with underground mining accidents. Vehicles are needed that; are able to traverse rough terrain, communicate over both wireless and tethered links, sense environmental parameters of the area they are operating within, provide an audible communication link between trapped personnel and rescuers, and can be adapted to have their electronic (e.g. energized) components enclosed in sealed, explosion proof compartments. In some applications robotic vehicles are needed that can remain mobile when semi-submerged. Vehicles are additionally needed that can perform self-rescue maneuvers in the event communication links to a remote operator are lost.

BRIEF DESCRIPTION OF THE DRAWINGS

The accompanying drawings, which are incorporated in and form part of the specification, illustrate embodiments of the present invention and, together with the description, serve to explain the principles of the invention.

DETAILED DESCRIPTION OF THE INVENTION

Commonly owned U.S. Pat. Nos. 6,484,083 issued Nov. 19, 2002 to Hayward et al., 6,488,306 issued Dec. 3, 2002 to Shirey et al., and 6,523,629 issued Feb. 25, 2003 to Buttz et al., are herein incorporated by reference in their entirety. Embodiments of robotic vehicles according to the present invention can include one or more tracked mobility platforms (e.g. sub-units) that are linked together to form a composite vehicle (e.g. unit) with greater mobility than that of an individual sub-unit. The following non-limiting exemplary embodiment is, for convenience only, drawn to a robotic vehicle comprising two linked mobility platforms, but any number of linked mobility platforms as required for a given application are anticipated by the present invention as well.

Figure 1:
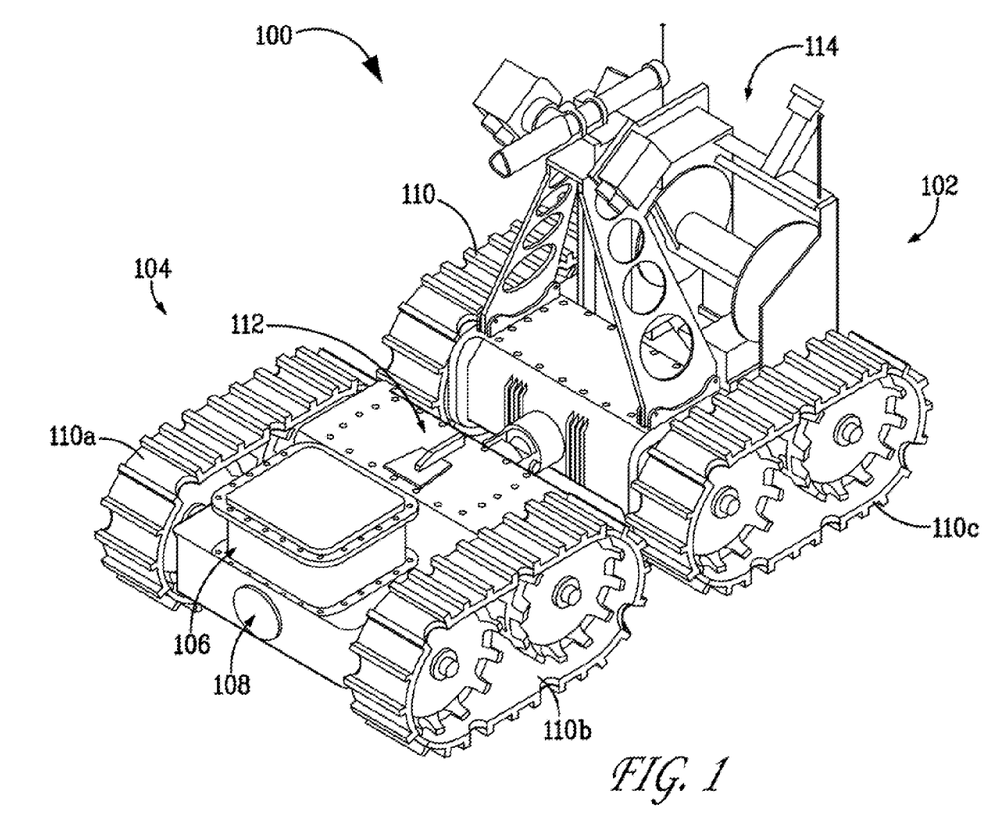
FIG. 1 is a schematic illustration of an embodiment of a robotic vehicle with linked tandem tracked mobility platforms according to the present invention.

FIG. 1 is a schematic illustration of an embodiment of a robotic vehicle 100 with tandem tracked mobility platforms 102 and 104 according to the present invention. The body of each mobility platform 102 and 104 can contain the batteries and drive motors (e.g. one drive motor for each track 110a-d in this example) necessary to provide the motive power to each mobility platform. The batteries can be contained in explosion proof sealed compartments 106, as can drive motors, vehicle control module and electronic components necessary to the operation of the vehicle. The use of sealed explosion proof compartments for energized components is desired where the robotic vehicle 100 may be operating in an environment containing explosive vapors or dust, as can be associated with a mining accident. The utilization of sealed compartments for the energized components additionally provides the robotic vehicle with the ability to operate semi-submerged through flooded areas, as can also be associated with mine collapses or accidents. The sealed compartments (e.g. 106) housing the electronic subsystems of the robotic vehicle 100 are carried within a chassis 106 of an open design for each of the mobility platforms 102 and 104. The open chassis design provides drain holes for water to drain out of the chassis 106 when operating in a semi-submerged state. The use of the open chassis design reduces the buoyancy of the vehicle 100, which provides for greater engagement of the tracks 110a-d with the floor of a flooded area thereby increasing mobility through the flooded area.

FIG. 1 additionally indicates an embodiment illustrating mounting a fiber optic tether reel 114 on the "rearward" mobility platform 102. The fiber optic tether 114 in concert with a radio frequency (RF) communications link (not shown) provides for two communication links between the vehicle's control module (e.g. on-vehicle communication and control electronics) and a remote operator. In underground and non-line-of-sight operations where a radio communications link can be problematic, a fiber optic communications link can provide multiple kilometers of remote operation. All communications links can be made to approved mine safety standards.

In one exemplary application, the chassis of a robotic vehicle was formed of a carbon fiber material having openings in the bottom to allow the vehicle to readily sink in water, and was designed to be capable of operating in up to twenty four inches of water. This depth of operation can easily be increased or decreased by changing the height of the pan/tilt support mast for mounting cameras, lights and sensors as described below. Speakers 108 and microphone 112 can be mounted on the robotic vehicle 100 to allow communication between the remote operator and trapped miners.

Figure 2:
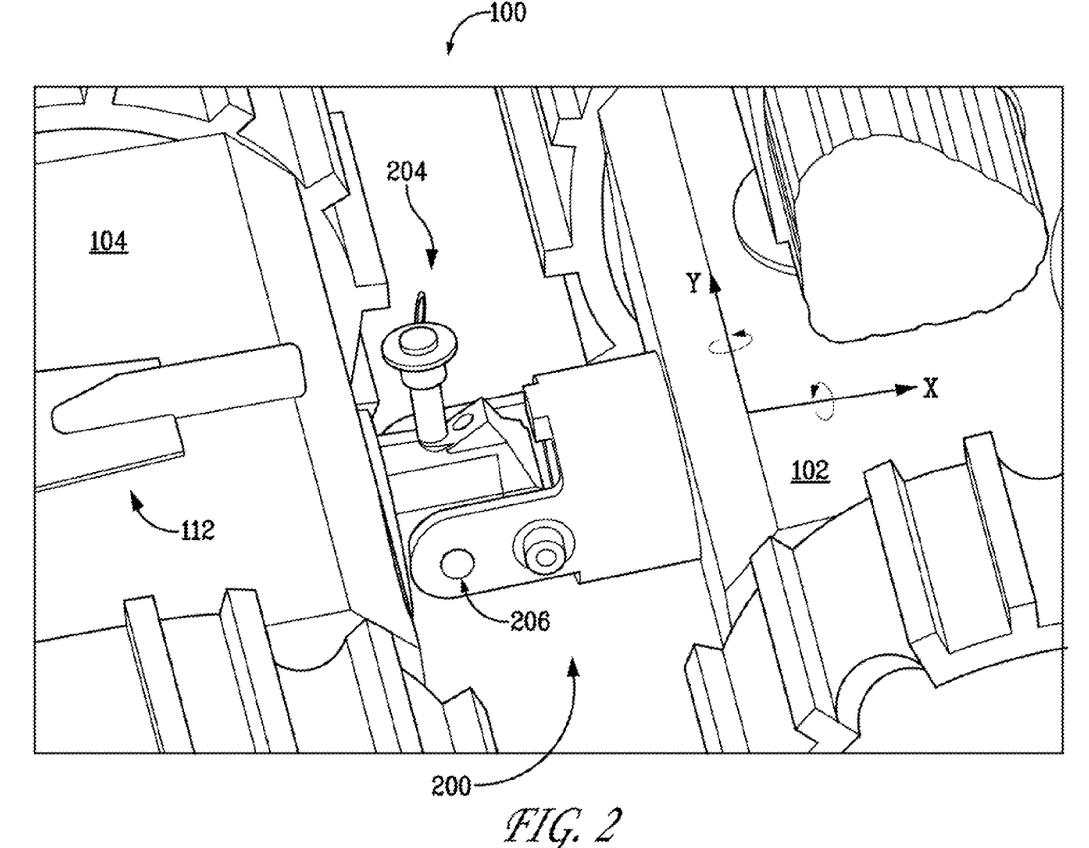
FIG. 2 is a schematic illustration of an embodiment of a two degree of freedom (2DOF) coupling for linking tandem tracked mobility platforms according to the present invention.
Figures 3, 3B:
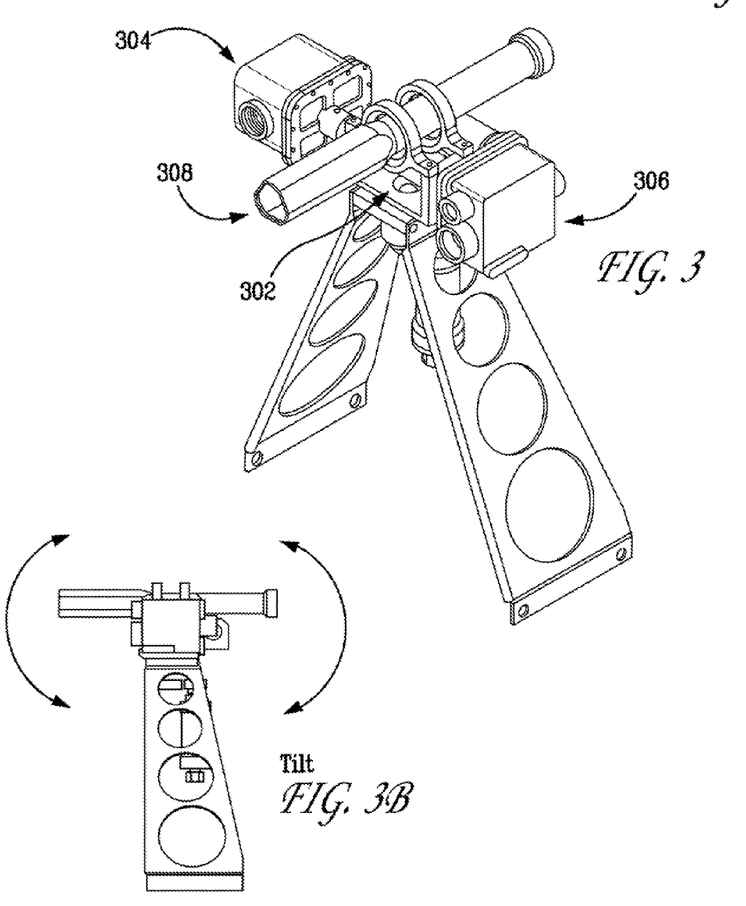
FIG. 3 is a schematic illustration of an embodiment of a support mast with pan and tilt base according to the present invention.
FIG. 3B is a side view of an embodiment of a support mast with pan and tilt base according to the present invention.
Figure 3A:
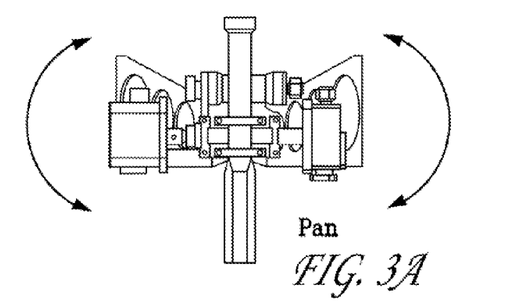
FIG. 3A is a bird's eye view of an embodiment of a support mast with pan and tilt base according to the present invention.

FIG. 2 is a schematic illustration of an embodiment of a two degree of freedom (2DOF) coupling 200 for linking tandem tracked mobility platforms 102 and 104 according to the present invention. In FIG. 2, the 2DOF coupling 200 is illustrated in the unlocked state (i.e. locking pin 204 in a stowed position) wherein the coupling 200 allows out-of-plane motion between the two tracked mobility platforms 102 and 104. Out-of-plane motion is defined as motion about a longitudinal axis ("X" axis in the figure) and a lateral axis ("Y" axis in the figure) of the robotic vehicle, where axes intersect at the coupling 200. Out-of-plane motions allow each mobility platform to independently crawl over an obstacle while maximizing contact between the tracks and the terrain they are traversing. It has been found that the use of the 2DOF coupling greatly increases vehicle mobility over obstacles such as rocks, curbs, stairs and railroad tracks.

In-plane motion is substantially prevented by the coupling 200 as an excessive amount of in-plane motion could cause interference (e.g. physical contact) between the tracks of the two mobility platforms thereby impeding mobility. In this exemplary embodiment, steering of the coupled robotic vehicle is accomplished by skid steering control of the individual tracks, and it is not required to "twist" the vehicle within the plane of the vehicle to effect a turn.

When desired, the 2DOF coupling 200 can be placed into a locked state, by inserting the joint locking pin 204 into the joint lock position 206. In the locked state, the coupling is essentially "rigid" and prevents out-of-plane as well as in-plane motions between the mobility platforms 102 and 104. The locked state can facilitate storage of the vehicle and transport of the robotic vehicle 100 to an area for deployment where it is needed. It can also facilitate more efficient mobility in unique operational cases such as climbing stairs FIG. 3 (including 3A and 3B) is a schematic illustration of an embodiment of a support mast 300 with pan and tilt base 302 according to the present invention. Imaging devices to provide visual reconnaissance to a remotely located operator can include for example, a visual light camera 304 (e.g. color CCD camera) and associated light source 308, as well as an infra-red camera 306 (e.g. forward looking infra-red or FLIR) mounted on the pan and tilt base 302 on the support mast 300. Environmental sensors (not shown) such as a temperature sensor, oxygen sensor, methane sensor, carbon monoxide sensor, carbon dioxide sensor etc., can be mounted on the support mast as well. It is also possible to mount inlets for gas sensors on the support mast, with the sensors themselves located within sealed electronics housings. Mounting of imaging devices and sensors on the support mast facilitates operation of the vehicle when partially submerged (e.g. sensors and imaging devices kept above the water line) and ensures accurate environmental sensor readings of the ambient atmosphere within which the robotic vehicle is operating. Additionally, mounting imaging devices on the support mast 300 and above the vehicle platform(s) provides a superior vantage point for teleoperation of the vehicle and allows the remote operator to look down and see most of the vehicle's surface during operation, providing the operator with a superior view of the scene in the event of negotiating abnormal circumstances (e.g. avoiding getting stuck, encountering obstacles etc.). Additional cameras (not shown) can be mounted on the forward and backward ends of the robotic vehicle to provide additional situational awareness to the operator.

Figure 4:
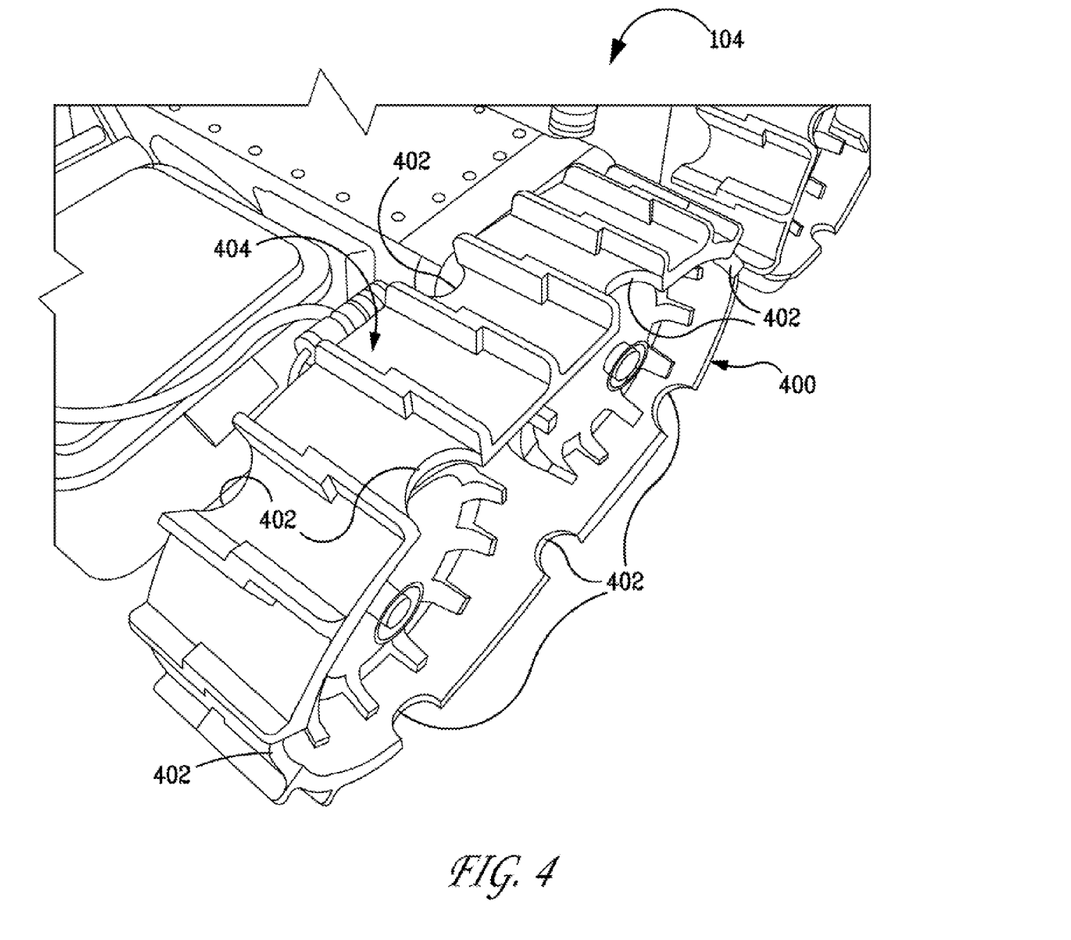
FIG. 4 is a schematic illustration of an embodiment of a track having edge-scallop cut-outs for a tracked mobility platform according to the present invention.

FIG. 4 is a schematic illustration of an embodiment of a track 400 for a tracked mobility platform 104 having edge-scallops (cut-outs), according to the present invention. To improve the mobility of the robotic vehicle while operating in semi-submerged environments the blade type lugs 404 can be spaced farther apart to improve the paddle like action desired when operating in water and enhance the vehicles climbing capability. For many applications, there are locations where a robotic vehicle will encounter the rails of railroad tracks. Early testing in these environments showed that traditional track designs could cause a vehicle to become high centered on a rail during diagonal crossings. Once high centered, the vehicle could move along the rail by leaning to one side and dragging itself along the rail, however a vehicle would have difficulty in pulling itself up, over and off of the rail. Embodiments of the new track design incorporate edge scallops 402 in the outer and/or inner edges of the track 400. The edge scallops 402 allow the track 400 to grab onto a rail whether on the outside or inside edges and then lift the vehicle up, onto and over the rail. Embodiments of tracks 400 incorporating the edge scallops 402 have been found to greatly increase the mobility of a robotic vehicle operating in environments with railroad tracks.

Figure 5A:
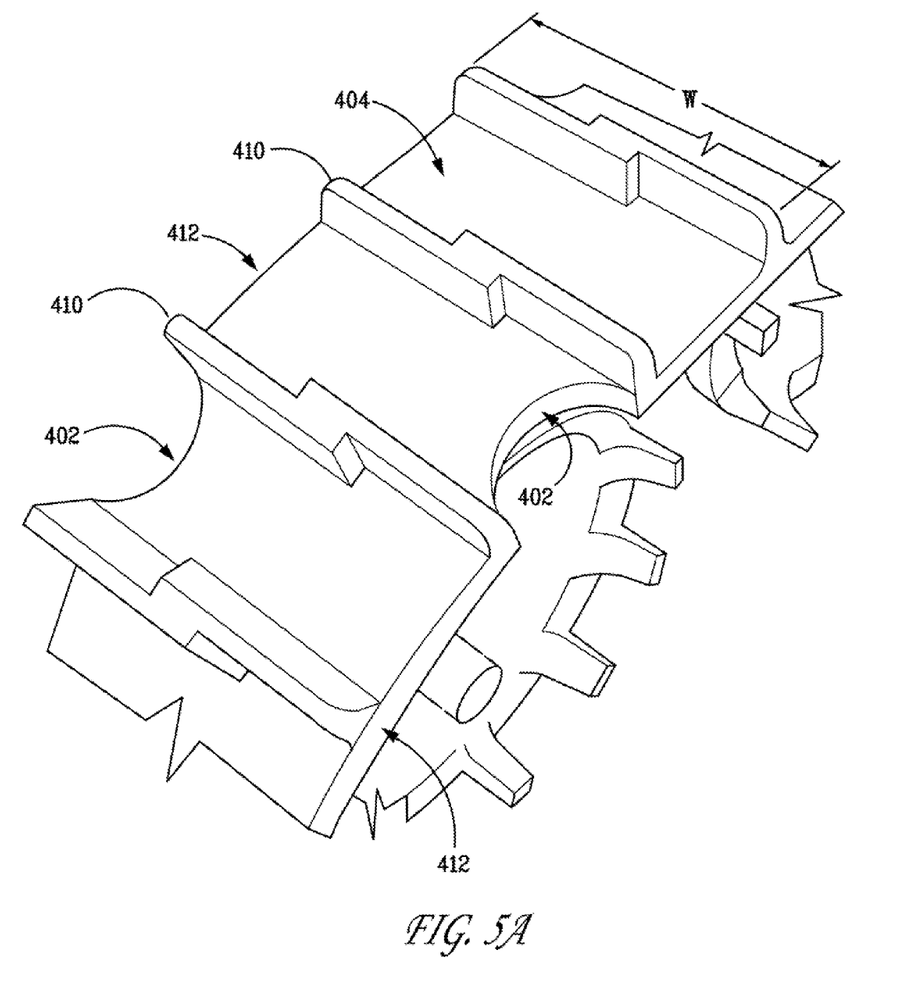
FIG. 5A shows a track with a pair of edge-scallop cut-outs.
Figure 5B:
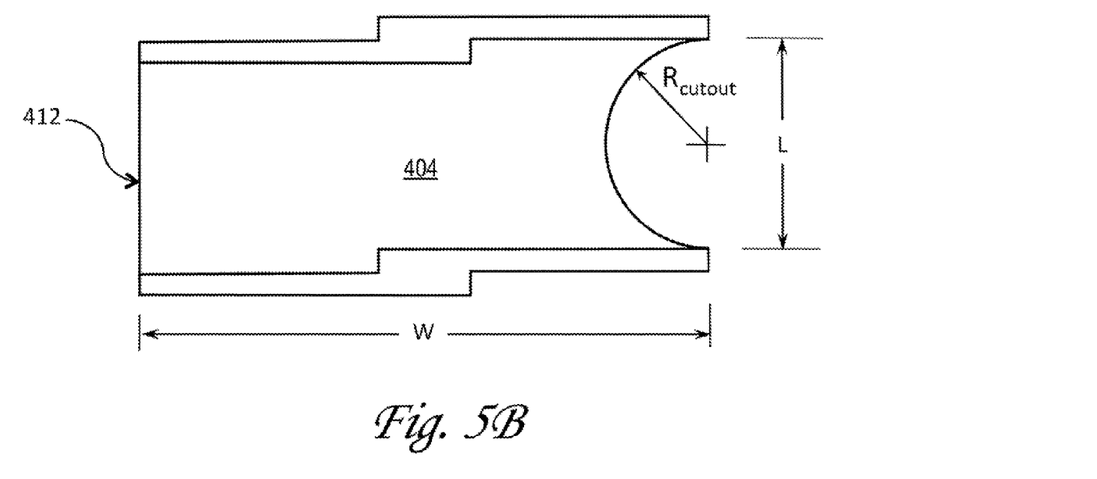
FIG. 5B shows a track with a semi-circular scallop cut-out.
Figure 5C:
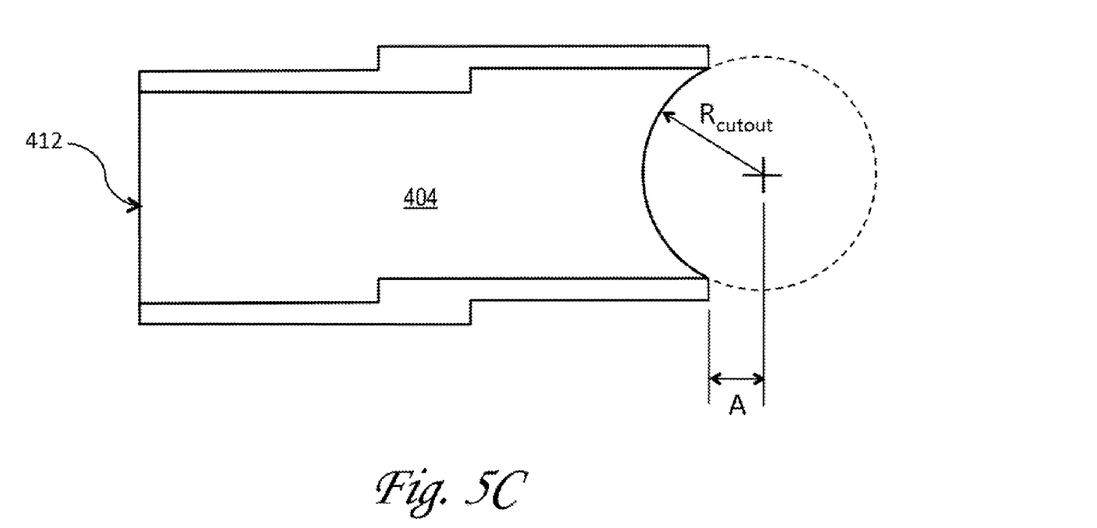
FIG. 5C shows a track with a scallop cut-out.

FIGS. 5A, 5B, 5C are schematic illustrations of embodiments of a track 404 for a tracked mobility platform 104 having edge-scallop cut-outs 402, according to the present invention. Track 404 can have horizontal blade-type lugs 410 having a width=W, and a spacing, L, between lugs (see FIG. 5B). In FIG. 5A, the ratio of W/L=2.5. Alternatively, the ratio of W/L can range from 2 to 3. Alternatively, the ratio of W/L can range from 1 to 10. The shape of the scallop cutout 402 can be circular, semi-circular, a partial arc of a circle, elliptical, for example. FIG. 5B shows a semi-circular cutout shape, having a radius of curvature=$R_{cutout}$. FIG. 5C shows that the cutout shape 402 has a partial arc of a circle, where the origin (small cross symbol) of the circle defining the shape has been offset (to the right) to a location outside of the track 404 by a horizontal distance, "A". In FIG. 5B, $R_{cutout}$=L/2. Alternatively, $R_{cutout} \leq L/2$. In FIG. 5C, $R_{cutout} \geq L/2$. Railroad tracks have a width at their head that ranges from about 2 to 4 inches. Accordingly, the spacing, L, between lugs 410 can be about the same as the width of the railroad track head. For example, if the width of the railroad track head is from 2 to 4 inches, then the spacing, L, can be from 2 to 4 inches, and, therefore, the radius of the scallop cut-out, $R_{cutout}$, can be from 1 to 2 inches.

Figure 6:
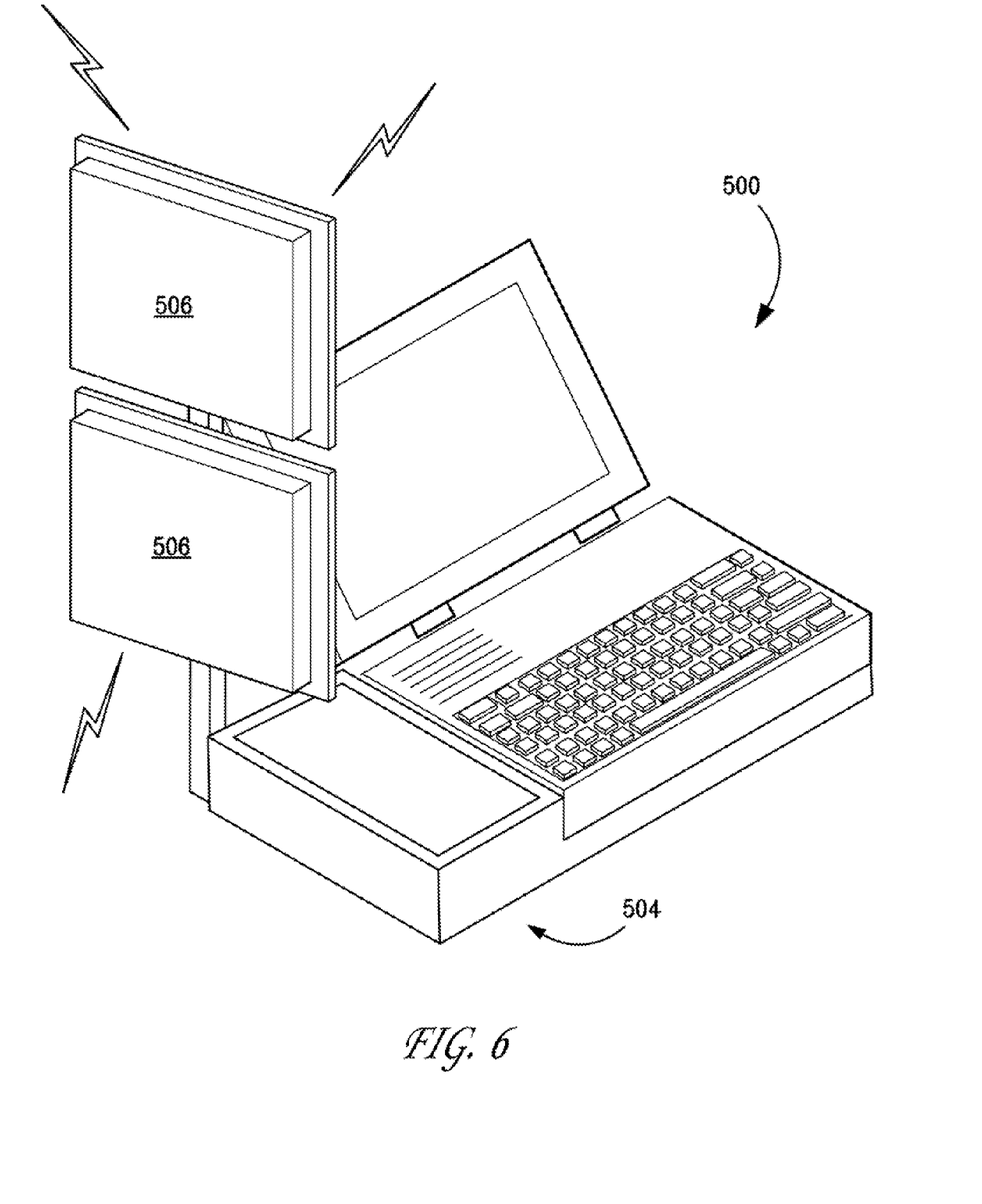
FIG. 6 is a schematic illustration of an embodiment of an operator control unit for remote operation of robotic vehicles according to the present invention.

FIG. 6 is a schematic illustration of an embodiment of an operator control unit (OCU) 500 for remote operation of robotic vehicles according to the present invention. A ruggedized laptop computer 502 is integrated into a power and communications unit 504 in this exemplary embodiment of an OCU. A robotic vehicle can then be controlled via a wireless hand controller 506 (e.g. XBOX 360® controller). A graphic user interface (GUI) has been developed for operator control of a vehicle. The GUI interface can be entirely controlled with the hand controller 506 including operator preference inputs, sensor reading ranges and alarm settings, camera pan/tilt/zoom, camera feeds and vehicle operation. The OCU can be powered off of batteries or a standard 110V AC input. A second hand controller can be provided and dedicated to line of sight vehicle teleoperation without the OCU activated. This allows for quick startup times for the system since the vehicle and OCU can be unloaded and started up in parallel. This feature additionally facilitates vehicle maintenance and system checkout.

Communications with a robotic vehicle include an integrated radio frequency (RF) and fiber optic links. This arrangement allows for on the fly switching between wireless RF and tethered fiber optic communications. In the advent of a total communication signal dropout, the vehicle control module (e.g. onboard the robotic vehicle) includes an auto-recover mode that has the vehicle perform multiple pre-determined maneuvers in an attempt to recover the signal. This includes the switch from fiber to wireless mode in case the fiber is severed and an autonomous safing mode in the event of an unrecoverable communication signal dropout. The auto-recover mode has the vehicle reverse the previous 2 or 3 commands in order to reacquire wireless signal. If this procedure fails to re-establish wireless communications, then the vehicle automatically resorts to the autonomous safing mode.

The above described exemplary embodiments present several variants of the invention but do not limit the scope of the invention. For example, the energized sub-systems of embodiments according to the present invention can be constructed and housed in traditional enclosures for operations in non-hazardous terrestrial applications, while embodiments for use as mine rescue vehicles can be constructed in explosion proof, water tight enclosures for operations in hazardous and/or semi-submersible applications. Those skilled in the art will appreciate that the present invention can be implemented in other equivalent ways. The actual scope of the invention is intended to be defined in the following claims.

What is claimed is:

1. A robotic vehicle comprising:
   at least first and second tracked mobility platforms, each of said at least first and second tracked mobility platforms having dual tracks, each track of said dual tracks having a drive motor coupled thereto;
   a plurality of track-edge scallop cut-outs disposed on one or more of an inside edge and one or more of an outer edge of each track;
   a two degrees of freedom (2DOF) coupling connecting the at least first and second tracked mobility platforms, the 2DOF coupling having an unlocked state wherein said unlocked state the 2DOF coupling is operatively arranged to allow out-of-plane motion relative to and between the at least first and second tracked mobility platforms and substantially prevent in-plane motion relative to and between the at least first and second tracked mobility platforms, the 2DOF coupling further having a locked state wherein said locked state said 2DOF coupling is operatively arranged to substantially prevent in-plane and out-of-plane motions relative to and between the at least first and second tracked mobility platforms;
   a fiber optic tether connected to at least one of the at least first and second tracked mobility platforms, the fiber optic tether operatively arranged to provide a first communication link between a vehicle control module mounted on the robotic vehicle and a remotely located operator control unit; and,
   a radio frequency communications module mounted on the robotic vehicle, the radio frequency communications module operatively arranged to provide a second communication link between the vehicle control module and the remotely located operator control unit.

2. The robotic vehicle of claim 1 further comprising a support mast connected to at least one of the first and second tracked mobility platforms, the support mast having a pan and tilt base.

3. The robotic vehicle of claim 2 further comprising one or more cameras selected from a visible light camera and an infra-red light camera, the one or more cameras mounted on the pan and tilt base.

4. The robotic vehicle of claim 3 further comprising one or more light sources selected from a visible light source and an infra-red light source, the one or more light sources mounted on the pan and tilt base.

5. The robotic vehicle of claim 1 further comprising one or more environmental sensors operatively arranged to sense one or more environmental parameters related to an environment within which the robotic vehicle is operating.

6. The robotic vehicle of claim 5 wherein the one or more environmental sensors comprise one or more sensors selected from a temperature sensor, an oxygen sensor, a methane sensor, a carbon monoxide sensor, and a carbon dioxide sensor.

7. A robotic vehicle comprising:
   a first and a second tracked mobility platform, each of said first and second tracked mobility platforms having dual tracks, each track of said dual tracks having a drive motor coupled thereto, each of said first and second tracked mobility platforms having a plurality of sealed explosion proof compartments for housing drive motors and electronic components therein;
   a plurality of track-edge scallop cut-outs disposed on one or more of an inside edge and one or more of an outer edge of each track;
   a two degrees of freedom (2DOF) coupling connecting the at least first and second tracked mobility platforms, the 2DOF coupling having an unlocked state wherein said unlocked state the 2DOF coupling is operatively arranged to allow out-of-plane motion relative to and between the at least first and second tracked mobility platforms and substantially prevent in-plane motion relative to and between the at least first and second tracked mobility platforms, the 2DOF coupling further having a locked state wherein said locked state said 2DOF coupling is operatively arranged to substantially prevent in-plane and out-of-plane motions relative to and between the at least first and second tracked mobility platforms;
   a support mast connected to at least one of the first and second mobility platforms, the support mast having a pan and tilt base;
   a forward looking infrared camera mounted on the pan and tilt base;
   a fiber optic tether connected to at least one of the first and second tracked mobility platforms, the fiber optic tether operatively arranged to provide a first communication link between a vehicle control module mounted on the robotic vehicle and a remotely located operator control unit; and,
   a radio frequency communications module mounted on the robotic vehicle, the radio frequency communications module operatively arranged to provide a second communication link between the vehicle control module and the remotely located operator control unit.

8. The robotic vehicle of claim 7 further comprising a visible light source and a visible light imaging camera, the light source and the imaging camera mounted on the pan and tilt base.

9. The robotic vehicle of claim 7 further comprising a speaker and a microphone mounted on the robotic vehicle, the speaker and the microphone operatively arranged to provide audible communication between an operator and an environment within which the robotic vehicle is operating.

10. The robotic vehicle of claim 7 further comprising one or more environmental sensors mounted to the robotic vehicle, the one or more environmental sensors operatively arranged to sense one or more environmental parameters related to an environment within which the robotic vehicle is operating.

11. The robotic vehicle of claim 10 wherein the one or more environmental sensors comprise one or more environmental sensors selected from a temperature sensor, an oxygen sensor, a methane sensor, a carbon monoxide sensor and a carbon dioxide sensor.

12. The robotic vehicle of claim 7 wherein each track comprises a plurality of horizontal blade type lugs in combination with the plurality of one or more track-edge scallop cut-outs.

13. The robotic vehicle of claim 12, wherein the one or more track-edge scallop cut-outs have a minimum radius of curvature, $R_{cutout}$, of the semi-circular shape is equal to or less than ½ of a distance, L, between a pair of adjacent horizontal blade type lugs.

14. The robotic vehicle of claim 12, wherein the one or more track-edge scallop cut-outs have a shape that is defined by an arc having a radius of curvature, $R_{cutout}$, that is greater than or equal to ½ of a distance, L, between a pair of adjacent horizontal blade type lugs; and wherein said arc has an origin of its radius of curvature; wherein said origin has a position that lies outside of the track.

15. The robotic vehicle of claim 7 further comprising an operator control unit, the operator control unit including a computer integrated into a power and communications unit.

16. The robotic vehicle of claim 7 wherein the vehicle control module has an auto recover mode, the auto-recover mode operatively arranged to control the robotic vehicle through one or more auto-recover maneuvers, in the event of a loss of a communications channel.

17. The robotic vehicle of claim 7, wherein the one or more track-edge scallop cut-outs have a shape that is defined by a semi-circle having a radius of curvature, $R_{cutout}$, that ranges from 1 to 2 inches.

18. A robotic vehicle comprising:
a first and a second tracked mobility platform, each of said first and second tracked mobility platforms having dual tracks, each track of said dual tracks having a drive motor coupled thereto, each of said first and second tracked mobility platforms having a plurality of sealed explosion proof compartments for housing drive motors and electronic components therein;
a plurality of track-edge scallop cut-outs disposed on one or more of an inside edge and one or more of an outer edge of each track;
a two degrees of freedom (2DOF) coupling connecting the at least first and second tracked mobility platforms, the 2DOF coupling having an unlocked state wherein said unlocked state the 2DOF coupling is operatively arranged to allow out-of-plane motion relative to and between the at least first and second tracked mobility platforms and substantially prevent in-plane motion relative to and between the at least first and second tracked mobility platforms, the 2DOF coupling further having a locked state wherein said locked state said 2DOF coupling is operatively arranged to substantially prevent in-plane and out-of-plane motions relative to and between the at least first and second tracked mobility platforms;
a support mast connected to at least one of the first and second mobility platforms, the support mast having a pan and tilt base;
a forward looking infrared camera mounted on the pan and tilt base;
a fiber optic tether connected to at least one of the first and second tracked mobility platforms, the fiber optic tether operatively arranged to provide a first communication link between a vehicle control module mounted on the robotic vehicle and a remotely located operator control unit; and,
a radio frequency communications module mounted on the robotic vehicle, the radio frequency communications module operatively arranged to provide a second communication link between the vehicle control module and the remotely located operator control unit; and
wherein the one or more track-edge scallop cut-outs have a shape that is defined by an arc having a radius of curvature, $R_{cutout}$, that is greater than or equal to ½ of a distance, L, between a pair of adjacent horizontal blade type lugs; and wherein said arc has an origin of its radius of curvature; wherein said origin has a position that lies outside of the track.

* * * * *